(12) United States Patent
Hartwell et al.

(10) Patent No.: US 11,567,553 B2
(45) Date of Patent: Jan. 31, 2023

(54) POWER SUPPLY UNIT POWER LEVEL PROTECTION LIMITS

(71) Applicant: Oracle International Corporation, Redwood Shores, CA (US)

(72) Inventors: David Warren Hartwell, Lancaster, MA (US); Andrew David Reid Brown, North Billerica, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/220,755

(22) Filed: Apr. 1, 2021

(65) Prior Publication Data

US 2022/0317752 A1 Oct. 6, 2022

(51) Int. Cl.
*G06F 1/30* (2006.01)
*G06F 1/3225* (2019.01)
*G06F 1/3287* (2019.01)

(52) U.S. Cl.
CPC .............. *G06F 1/30* (2013.01); *G06F 1/3225* (2013.01); *G06F 1/3287* (2013.01)

(58) Field of Classification Search
CPC .................................... G06F 1/30; G06F 1/32
See application file for complete search history.

(56) References Cited

U.S. PATENT DOCUMENTS

| 8,924,752 | B1 | 12/2014 | Law et al. |
| 2009/0316671 | A1 | 12/2009 | Rolf et al. |
| 2011/0148383 | A1 | 6/2011 | Mullen et al. |
| 2011/0173468 | A1* | 7/2011 | Egan ........................ G06F 1/30 713/320 |
| 2012/0144183 | A1 | 6/2012 | Heinrichs et al. |
| 2014/0181546 | A1 | 6/2014 | Hallberg et al. |
| 2014/0281646 | A1 | 9/2014 | Jau et al. |
| 2015/0122474 | A1 | 5/2015 | Petersen |
| 2015/0205336 | A1 | 7/2015 | Walker |
| 2017/0060214 | A1 | 3/2017 | Yang |
| 2019/0309562 | A1 | 10/2019 | Hall et al. |
| 2020/0042068 | A1 | 2/2020 | Rong et al. |
| 2020/0076628 | A1* | 3/2020 | Yam ........................ H04L 12/10 |
| 2020/0133379 | A1 | 4/2020 | Muccini et al. |
| 2021/0156582 | A1 | 5/2021 | Stevenson et al. |

* cited by examiner

*Primary Examiner* — Paul B Yanchus, III
(74) *Attorney, Agent, or Firm* — Invoke

(57) ABSTRACT

Techniques are disclosed for managing power supplies and related power consumption alerts for a server based on the availability of redundant power supplies. When the system detects that a redundant power supply to a server has ceased to provide power, the system configures a new power consumption threshold for the remaining power supply. The new power consumption threshold is different than an initial power consumption threshold (if configured) when the redundant power supply was providing power. A power consumption threshold for triggering power consumption alerts for a power supply may be based on a number of power supplies actively providing power.

32 Claims, 7 Drawing Sheets

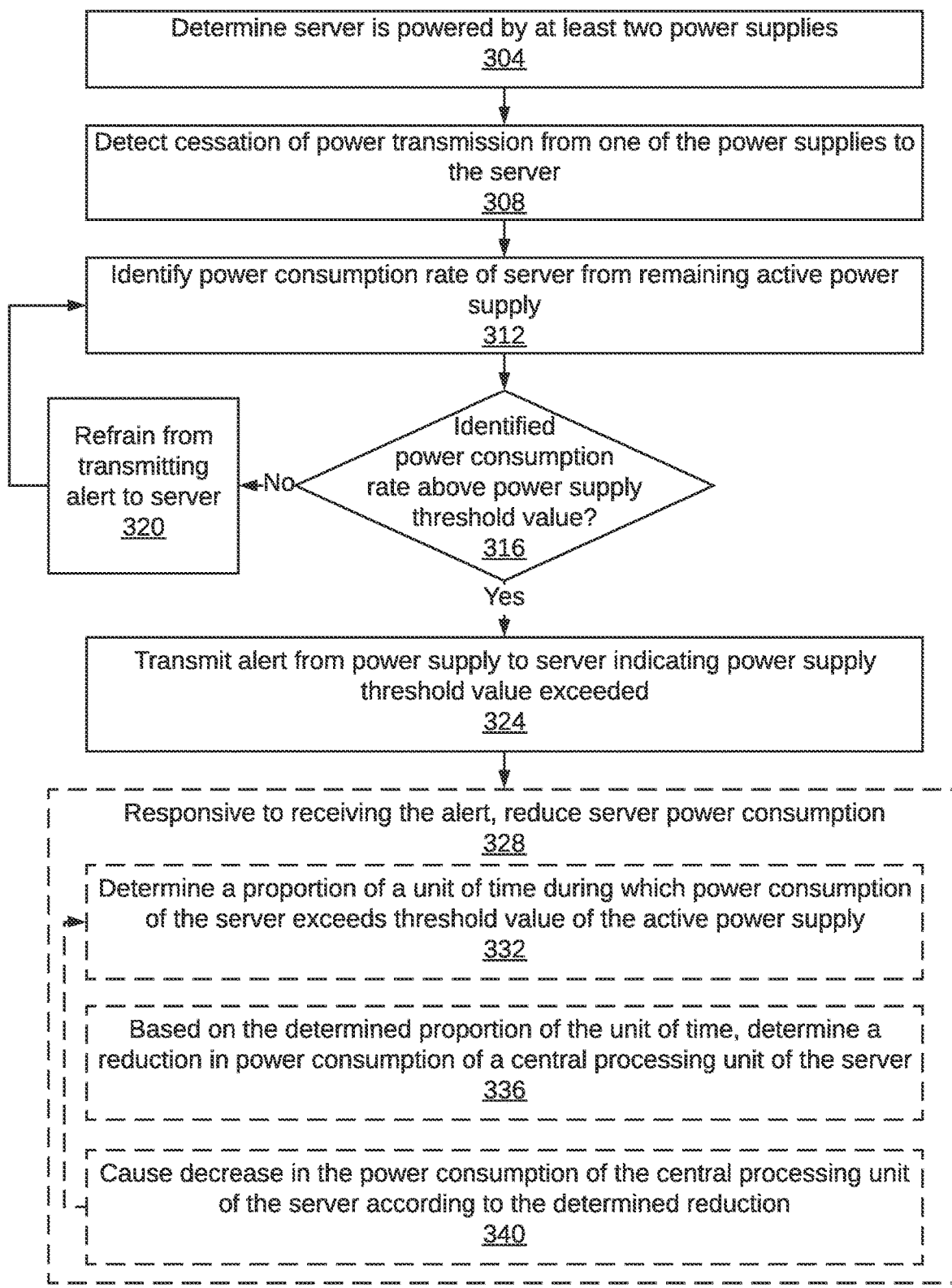

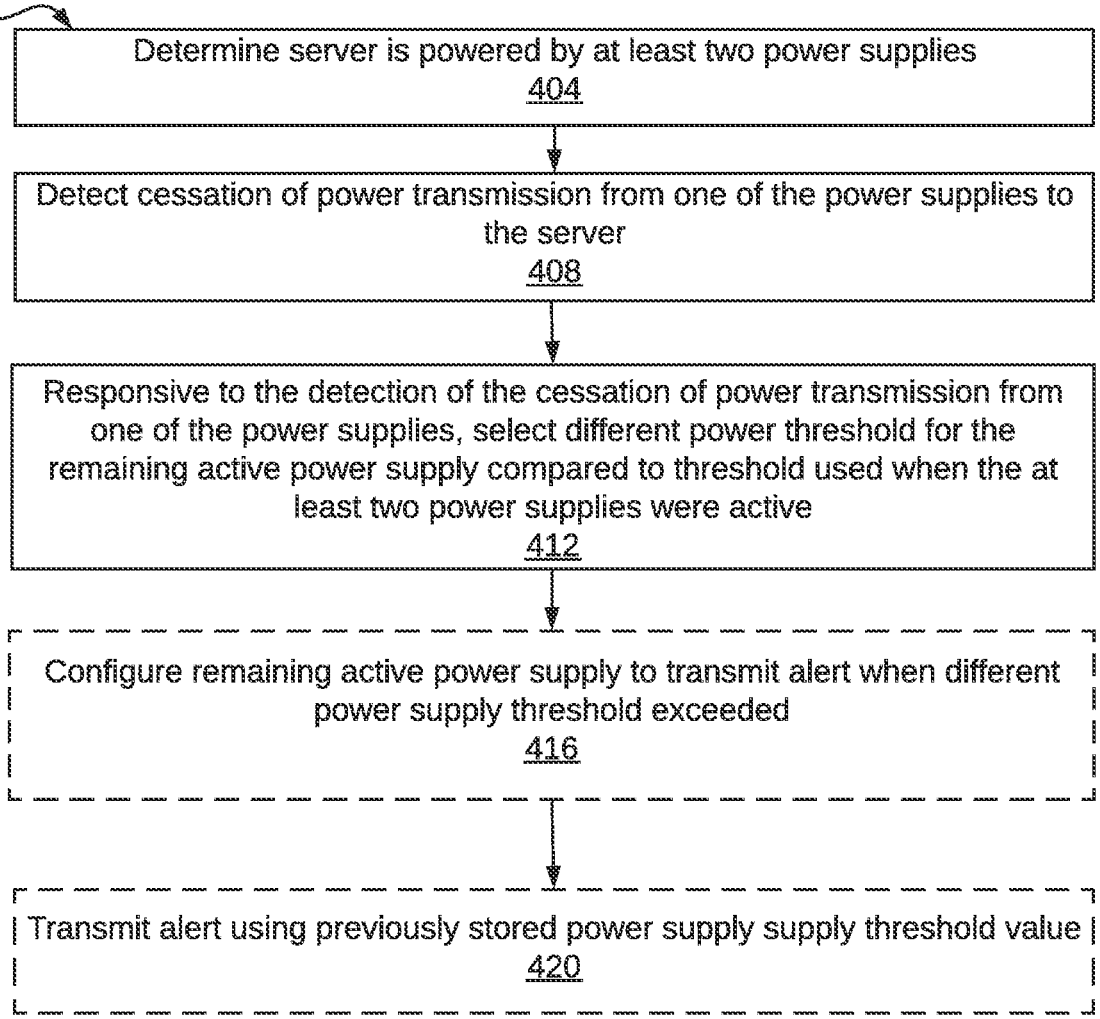

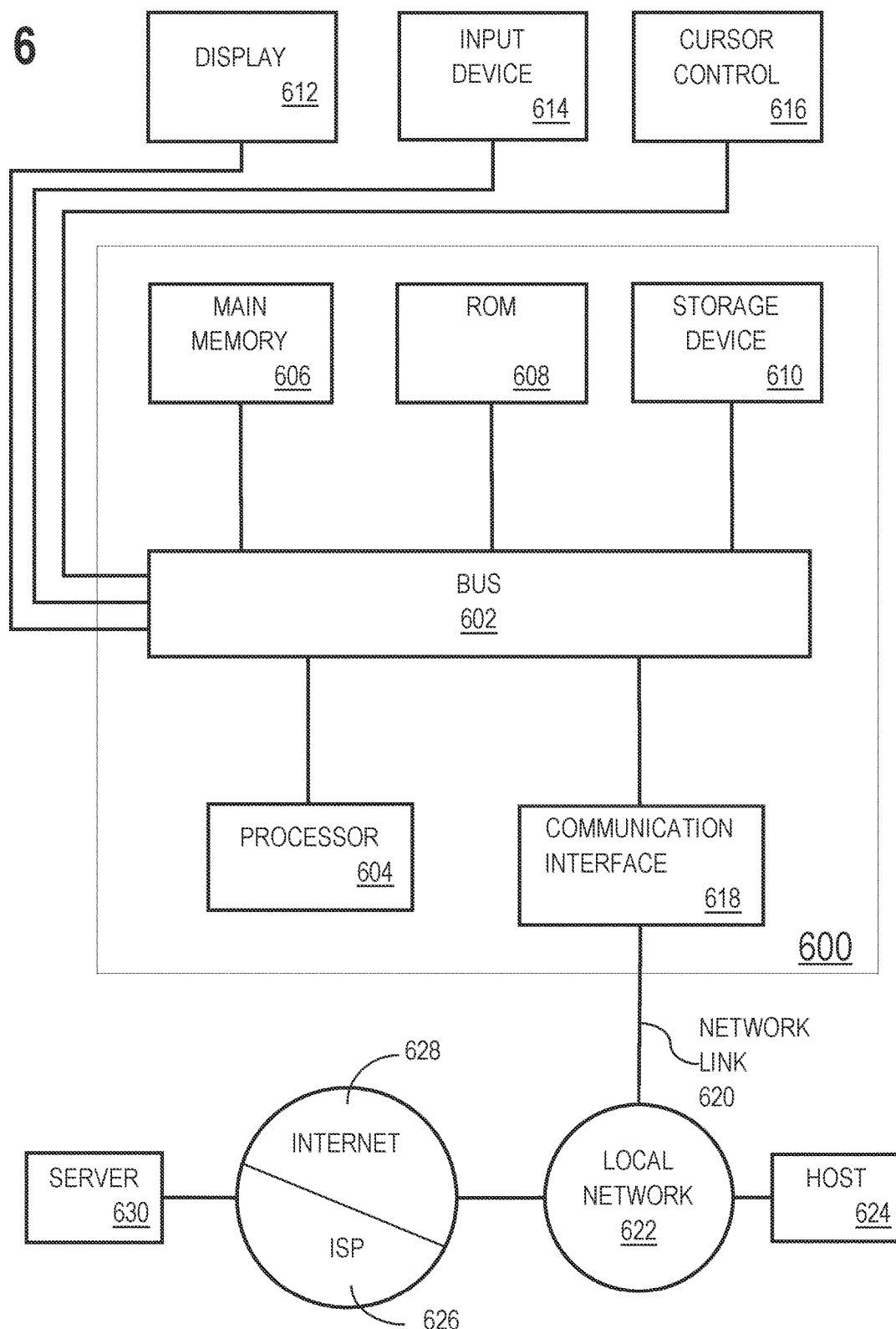

POWER SUPPLY UNIT POWER LEVEL PROTECTION LIMITS

TECHNICAL FIELD

The present disclosure relates to controlling server power consumption during periods in which a number of power supplies to a server is reduced. In particular, the present disclosure relates to generating power level protection limits for server power supply units.

BACKGROUND

Commercial computing entities have increasingly sold database storage space and computation power as a service to other commercial entities. In this environment, computing operations are often concentrated in computing centers (colloquially described as "server farms"). These computer centers may house hundreds or thousands of chassis or "racks," each of which may hold several servers. Because of the proximity of servers within a rack to one another and because of the concentration of racks in the computing center, the thermal state and power demands of servers are generally monitored closely to prevent overheating and/or drawing too much power.

As the demand for cloud-based computing services has expanded, a typical number of servers housed within a data center has increased. In some cases, this increase is driven by increasing a number of servers held within a rack, thereby increasing computing power per square foot of a server farm. Operating multiple servers within a rack provides a number of conveniences, including improved organization (e.g., physical addressing) of the servers and improved organization of power and data input and output cables. In some cases, an architect may design a rack as a coherent system, in which the power requirements, processing power (e.g., central processing unit (CPU) cycles per unit time), waste heat generation and thermal considerations of the individual servers are considered collectively. In this way, the physical configuration of the rack is designed to accommodate power inputs, cooling systems, and other server operational needs.

Given the cascade of negative operational impacts caused by excess server temperature, some server CPUs are equipped with a process that dramatically restricts power consumption to avoid overheating. This "prochot" process decreases CPU power consumption, and therefore waste heat generation, by significantly decreasing CPU processor cycles per unit time. Prochot generally reduces CPU cycles by a fixed amount for a fixed period of time for every invocation of the prochot process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 illustrates an example set of operations for generating an alert that may be used to reduce server power consumption in response to a loss of power from one of a set of redundant power supplies in accordance with one or more embodiments;

FIG. 4 illustrates an alternate example set of operations for generating an alert that may be used to reduce server power consumption in response to a loss of power from one of a set of redundant power supplies in accordance with one or more embodiments;

FIG. 6 shows a block diagram that illustrates a computer system in accordance with one or more embodiments.

DETAILED DESCRIPTION

Figure 1A:
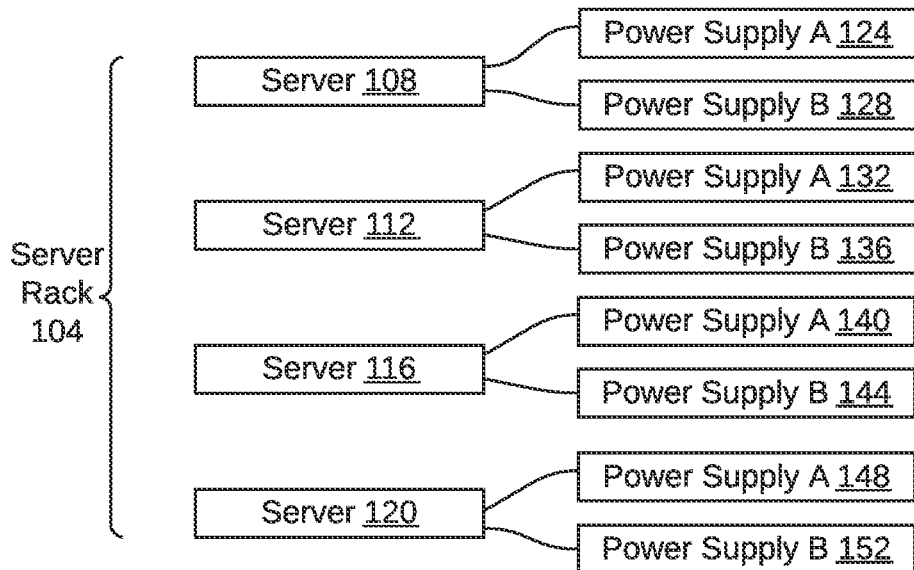
FIG. 1A schematically illustrates a server rack with multiple constituent servers, each of which is supplied electrical power by two power supplies in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SERVER POWER CONTROL SYSTEM
4. METHODS FOR CONTROLLING SERVER POWER CONSUMPTION
5. EXAMPLE EMBODIMENT
6. COMPUTER NETWORKS AND CLOUD NETWORKS
7. MISCELLANEOUS; EXTENSIONS
8. HARDWARE OVERVIEW

1. GENERAL OVERVIEW

One or more embodiments manage power supplies and related power consumption alerts based on the availability of redundant power supplies. Initially, multiple power supplies may provide power to a system. Each power supply may or may not be configured with an initial power consumption threshold that trigger alerts when consumption of power (e.g., by a CPU) exceeds the power consumption threshold.

If not configured with an initial power consumption threshold, then any level of power consumption does not trigger an alert. If configured with an initial power consumption threshold, then a level of power consumption that exceeds the initial power consumption threshold results in the triggering of an alert. Such an alert may be referred to herein as a PSU Alert signal. When the system detects that a redundant power supply has ceased to provide power, the system configures a new power consumption threshold for the remaining power supply. In other examples a power consumption threshold may be set in advance. This pre-sent threshold value scenario may decrease a time required to reduce a rate at which power is consumed. Regardless, embodiments described herein configure the power consumption threshold for triggering power consumption alerts for a power supply based on a number of power supplies actively providing power.

One or more embodiments handle power consumption alerts, corresponding to consumption of power from a power supply exceeding a threshold, based on a number of power supplies actively providing power. If a minimum number of power supplies (e.g., two power supplies) are actively providing power, the system may ignore the power consumption alerts received from any of the active power supplies. Ignoring power consumption alerts includes refraining from taking actions that result in reduction of power consumption. If the minimum number of power supplies are no longer actively providing power, the system takes action in an attempt to reduce power consumption.

In an example, the system ignores power consumption alerts from any power supply when at least one other redundant power supply is providing power. The system takes action to attempt to reduce the consumption of power when the system detects a concurrent occurrence of (a) failure of redundant power supplies and (b) consumption of power from a remaining power supply exceeds a power supply threshold. The action may include transmitting a signal in an attempt to reduce the consumption of power. The signal may include, for example, a PROCHOT signal to a service processor that has the ability to reduce power consumption by a CPU by updating CPU registers. The action of transmitting a signal in the attempt to reduce the consumption of power may or may not result in reduction of power.

One or more embodiments described in this Specification and/or recited in the claims may not be included in this General Overview section.

2. ARCHITECTURAL OVERVIEW

Configuring servers to receive power from multiple power supplies is common in many examples of individual server architectures. In some examples, the expected power demand of a server is divided between two or more power supplies, with each of the power supplies providing a portion of power to a server. While power to the server is maintained even when one power source becomes inoperative, a risk of this power supply configuration is that the power supply in operation may exceed a corresponding recommended power supply rating. The risk of exceeding this power supply rating (namely, by providing a level of power previously supplied by two or more power supplies) is that circuit breakers in the power supply itself or elsewhere in a server farm (e.g., data center) power supply circuit may be activated. Activating circuit breakers protects the power supply from overheating or otherwise being damaged, but also may cause power loss to the server. In some cases, depending on a location within the power system where a circuit breaker is first activated, multiple servers and/or multiple racks may experience a power loss. Power loss for one server in a cloud computing center, let alone, multiple servers, can cause significant operational problems to the entities purchasing cloud computer services and significant revenue loss to the entity operating the cloud computing center.

To avoid this power loss, some server management systems may engage the prochot protocol, sometimes present in the hardware of many CPUs, to reduce the power consumption by the server when a power loss is detected. When engaged, prochot dramatically reduces the operational activity (e.g., processor cycles per unit time) of a CPU for a predefined period of time, thereby reducing CPU power demands and preventing a remaining power supply (or supplies) from exceeding a recommended power supply limit or activating circuit breakers.

While convenient to implement, engaging the conventionally applied prochot protocol to manage power consumption also comes with a significant disadvantage. Prochot decreases CPU power demands by significantly decreasing CPU processor cycles per unit time by a fixed amount (e.g., in various examples by as much as 25%, or 30%) for a fixed period of time. This significant decrease is applied uniformly and consistently for every event meeting the prochot triggering conditions, regardless of severity. This dramatic decrease in processor cycles dramatically reduces the productivity servers and increases the completion time of tasks for cloud computing assignments. These implications may cause inconvenience, business disruption, lost revenue, and a variety of other undesirable outcomes.

Embodiments described below manage power demands placed on a reduced set of power supplies by a server while avoiding the dramatic disruption caused by engaging prochot, or an analogous process, as described above. Embodiments herein detect a cessation of power from, for example, one power supply of a set of multiple power supplies. The system then determines if the remaining power supply (or any of the remaining power supplies) is supplying power above a threshold value. In some examples, a threshold value is specific to each power supply, and may even be stored in a memory structure (a "register") individually associated with each of the power supplies. In response to determining that the supplied power does exceed the threshold value associated with the remaining active power supply, the remaining power supply may generate a signal (or "alert") indicating to the system that the threshold power has been exceeded. In response to receiving this alert, the system may restrict the power consumed by the server in proportion to a duration of a measurement intervals during which the threshold power supply value is exceeded. The system may continually monitor the proportion of successive measurement intervals during which the alert is received and increase or decrease the server power consumption accordingly. In this way, the impact to CPU performance is limited in both severity and time, unlike the consistent and severe power restriction caused by engaging prochot.

FIG. 1A illustrates a system 100 in accordance with one or more embodiments. As illustrated in FIG. 1, system 100 includes a server rack 104 that houses servers 108, 112, 116, and 120. In this example, each of the servers 108, 112, 116, and 120 is powered by two power supplies, indicated as power supply A and power supply B. More specifically, server 108 is powered by power supply A 124 and power supply B 128; server 112 is powered by power supply A 132 and power supply B 136; server 116 is powered by power supply A 140 and power supply B 144; and server 120 is powered by power supply A 148 and power supply B 152.

In one or more embodiments, the system 100 may include more or fewer components than the components illustrated in FIG. 1. The components illustrated in FIG. 1 may be local to or remote from each other. The components illustrated in FIG. 1 may be include elements that are implemented in software and/or hardware. Each component may include elements that are be distributed over multiple applications and/or machines. Multiple components may be combined into one application and/or machine. Operations described with respect to one component may instead be performed by another component.

In some examples, the server rack 104 is simply a chassis or frame into which multiple servers may be attached. While the server rack 104 is shown as housing four servers (e.g., servers 108, 112, 116, and 120), server racks may be configured to house any of a number of servers (e.g., 1, 2, 4, 10, 20 or more).

The server rack 104 improves the convenience with which servers are placed and maintained in a computing center. For example, the server rack 104 enables multiple servers to be stacked over one another, thereby increasing the density of servers within the computing center (e.g., increasing a number of servers and/or computing cycles per square foot). In some examples, server racks such as the server rack 104 also improve the convenience of organizing and/or physically manipulating servers. For example, using server racks may improve the convenience of the addressing and labeling of physical servers so that specific devices may be easily found (e.g., via systematic labeling) within a vast computing center with hundreds and/or thousands of servers.

The server rack 104 may also improve the convenience, maintenance, and operation of servers by preserving access to portions of the servers needed for operation despite being stacked. For example, the server rack 104 may secure the stacked servers while leaving data and power ports exposed, visual status indicators (e.g., a power indicator, an operating condition indicator) visible, and cooling structures (e.g., fans, heat sinks) with enough physical clearance to exhaust waste heat.

The servers 108, 112, 116, and 120 are computing systems that may store data and/or perform computing functions for communicatively coupled client devices. Examples of servers include file servers, web servers, application servers, database servers, and the like.

Figure 1B:
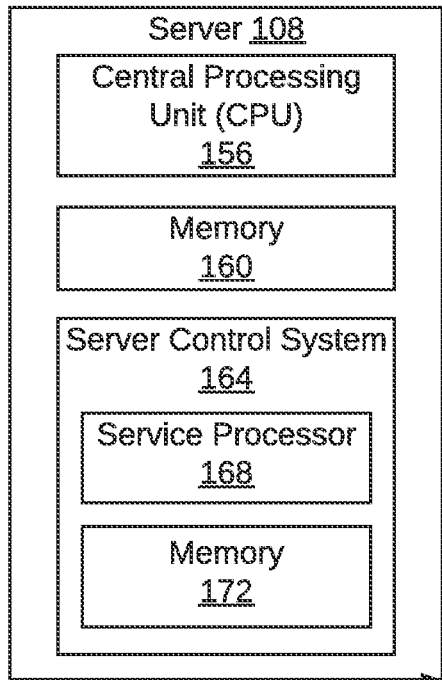
FIG. 1B schematically illustrates a server that includes computing elements, and a server control system that may dynamically adjust server activity to optimize server performance in response to loss of power from one of a set of power supplies in accordance with one or more embodiments.

Server 108, which is representative of servers 112, 116, and 120 is illustrated in schematic detail in FIG. 1B. At a high level, the server 108 (and servers 112, 116, and 120) may include a central processing unit (CPU) 156, a memory 160, and a server control system 164.

The CPU 156 of the server 108 may include an integrated logic circuit (e.g., a microprocessor) that operates to execute instructions and process data in response to requests. In some examples, the CPU 156 may include multiple integrated circuit devices that may operate in coordination with one another to execute instructions and process data in response to requests. For example, the CPU 156 may actually include multiple integrated logic chips, memory chips (e.g., volatile memory, such as static random access memory (SRAM) chips), among other integrated circuit devices. The configuration, components, and design of the CPU 156 may vary depending on the intended use of the server. For example, web servers may have a CPU or CPU chipset that is designed according to different performance objectives that a database server.

The memory 160 of the server may include volatile and/or non-volatile memory devices, that include flash memory, dynamic random access memory (DRAM) devices, SRAM devices, optical memory, magnetic memory, among others.

Much like the CPU 156, the memory 160 may be configured according to the intended function of the server 108. For example, a database server (e.g., an SQL server) that primarily functions to store, retrieve, and display requested data may include memory that is sufficient to temporarily store multiple data requests from multiple client devices and further store the requested data that has been retrieved from a data storage device. In this example, the memory 160 may include a combination of volatile and non-volatile memory that may be several gigabytes.

In other examples, the memory 160 of the server 108 may store data for use by the server itself. For example, the memory 160 may be configured to store data and/or instructions for managing the operations of the server 108 itself or for use in operations that the server 108 is requested to perform. For example, the memory 160 may store executable code in memory structures for the execution of prochot and/or the techniques described below in the context of FIGS. 3 and 4.

The server control system 164 includes devices, systems, and executable code for operating the server 108. The example server control system 164 illustrated in FIG. 1B is shown as including a service processor 168 and a memory device 172. Because the server control system 164 is a computing device embedded within the server 108 to control server 108 operations, the server control system 164 may include devices and systems that are not shown in FIG. 1B for convenience of illustration.

In some examples, the server control system 164 may monitor operating temperatures of various components of the service 108 (e.g., the CPU 156), store and execute instructions that alter operating conditions (e.g., reduce processor cycles of the CPU 156, increase cooling fan speed, store and execute prochot) to optimize reliable operation of the server 108 or prevent damage.

The server control system 164 may also enable other necessary operating functions of the server 108, such as monitor power supply levels, enable remote access to the server 108 (e.g., by engaging security protocols and facilitating secure communications via internet protocols), engaging power up/power down protocols and systems, among other operations.

Examples of the service processor 168 may include integrated circuits, such as microprocessors, field programmable gate arrays (FPGAs), application specific integrated circuits (ASICs) and the like.

In some examples, the service processor 168 may include multiple processors and memory structures that the service processor 168 may selectively employ to perform the techniques described herein.

The memory 172, which may be in communication with the service processor 168, may include any of the memory devices described above. These may include SRAM, DRAM, flash memory, magnetic memory, optical memory, or other forms of volatile and/or non-volatile memory. The memory 172 may store executable code and/or data for use by the service processor 168.

In some examples, the memory 172 may include distinct memory regions, addresses, registers, and/or devices that are specifically designed for aspects of the following techniques.

In one illustration of the operation of the server control system 164, the service processor 168 may be in communication with various systems and sensors that monitor performance and operation of the server 108. For example, the service processor 168 may monitor temperature values from temperature sensors in the server 108. The service processor 168 may also monitor active operational parameters of active cooling systems, such as cooling fan speed and/or a flow rate of cooling air through monitored air input channels. In some examples, to facilitate its analysis, the service processor 168 may even temporarily store temperature values and cooling parameters as a function of time.

The service processor 168 may compare operational thresholds and/or action limits stored in the memory 172, transmit instructions to alter a cooling fan speed so that temperature values may be optimized. In some examples, the service processor 168 may engage the prochot protocol, stored in the memory 172, to reduce an operating temperature of the CPU 156.

In some examples, the service processor 168 or other processing devices associated with the server control system 164 (e.g., FPGAs, ASICs) may monitor an operation status of the multiple power supplies that provide power to the server 108. For example, as described below in more detail, each of the power supplies in communication with the server 108 may transmit a status of the external power (whether alternating current (AC) or direct current (DC)) supply into each of the power supplies. The service processor 168 or similar processing device in the server control system 164 may receive the signal indicating whether the external power into each of the power supplies is active or inactive. Similarly, as described below in more detail, each of the power supplies in communication with the server 108 may transmit a status of the direct current power supply transmitted from the power supply to the server 108. The service processor 168 or similar processing device in the server control system 164 may receive the signal indicating whether the DC power from each of the power supplies is active or inactive.

As described below in more detail, the service processor 168 or similar processing device in the server control system 164, in cooperation with the memory 172 may also measure periods of time and a identify a proportion of each time period in which a signal received from a power supply indicates whether a level of supplied power exceeds a threshold level. Once identified, the server control system may instruct the CPU 156 to increase or decrease its activity, thereby controlling its power consumption.

Figure 1C:
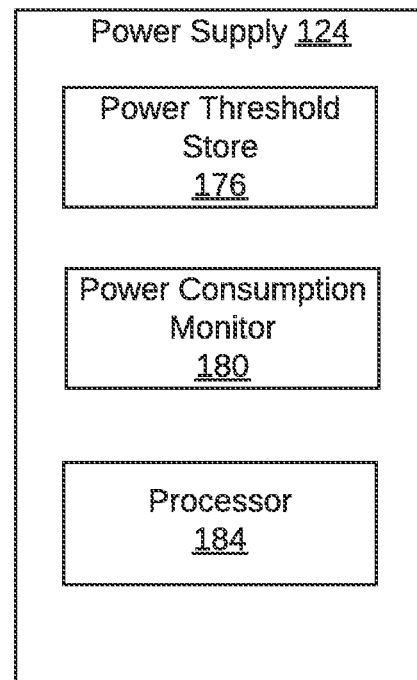
FIG. 1C schematically illustrates a power supply that includes features that store a power supply limit, monitor power supply levels, and informs a server when a power supply limit is exceeded in accordance with one or more embodiments.

Turing to FIG. 1C, the power supply 124 is illustrated. The power supply 124 is representative of the power supplies 124-152. The power supply 124 may include elements found in many different types of power supplies to transmit and transform electrical energy. These elements are omitted from the FIG. 1C for convenience of illustration.

The power supply 124 (and analogous power supplies 128-152) supplies power to a corresponding server (as identified in FIG. 1A). The power supply 124 may include conductors and power cables to receive power from a power source and transmit power to a corresponding server. The power supply 124 may also include electrical elements, such as resistors, capacitors, and transformers. These electrical elements may convert AC electricity received from a power source to DC electricity that is transmitted from the power supply to a connected server. These electrical elements may also alter electrical characteristics such as current and voltage from values used by the power source to those used by the server.

In addition to the elements commonly found in power supplies described above, the power supply 124 (and analogous power supplies 128-152) also includes a power threshold store 176, a power consumption monitor 180, and a processor 184.

The power threshold store 176 may include a non-volatile memory device that stores an upper power threshold value. This power threshold value is generally less than a maximum rated power supply value for the power supply 124. As described below in more detail, this threshold value may be used to optimize power supply to a server, and more specifically, optimize CPU computation productivity, in light of cessation of activity of one power supply from the set of power supplies.

The power consumption monitor 180 may include a memory device to store and/or otherwise monitor instantaneous values of power supplied to a connected server. For example, the power consumption monitor may be in communication with one or more devices configured to measure a level of power transmitted by the power supply 124 to a connected server. The power consumption monitor 180 may measure power consumption data as a function of time, for example storing a power measurement value with a timestamp or index value corresponding to a measurement time. In some examples, the power consumption monitor 180 may monitor power supply values continuously, or at periodic intervals. For example, the power consumption monitor 180 may monitor power supply values throughout measurement intervals of 10 microseconds, 100 microseconds, 500 microseconds, 10 milliseconds, 100 milliseconds, or other convenient intervals. Upon completion of a measurement interval, the power consumption monitor may cyclically restart the measurement process within a new instantiation of the measurement interval. In some examples, the power consumption monitor 180 may transmit the power consumption data to the processor 184.

Examples of the processor 184 include those described above, such as a logic microprocessor, an FPGA, an ASIC, and the like. The processor 184 may receive data from the power consumption monitor 180 and compare the received instantaneous data to the threshold value stored in the power threshold store 176.

In examples described below, upon detecting that power transmitted by the power supply 124 exceeds the threshold value stored in the power threshold store 176, the processor 184 may transmit a signal to the server 108. This transmitted signal may alert the server 108 of the exceeded power threshold condition (referred to herein as an "alert" signal). The signal may be transmitted via an ethernet cable placing the processor 184 of the power supply 124 in communication with the server control system 164 via corresponding ethernet ports. In other examples, the signal may be transmitted from the processor 184 of the power supply 124 to the server control system 164 wirelessly (e.g., via Bluetooth or IEEE 802.11 wireless communication protocols) via a dedicated communication channel or virtual communication port.

In some examples, the processor 184 may transmit an "alert" signal to the server 108 periodically or at a designated frequency during an excess power supply condition. For example, the processor 184 may transmit a distinct alert signal to the server control system 164 for each power level detected by the power consumption monitor 180 to be in excess of the threshold value stored in the power threshold store 176. In other examples, the processor 184 may transmit an alert signal to the server control system 164 representing a subset of power supply measurements, such as every 5, 10, 50, or 100 power supply values. In other examples, the processor 184 may transmit an alert signal to the server control system 164 at a same frequency or a lower frequency than the power supply measurements are collected by the power consumption monitor 180.

A processor 184 associated with a particular power supply 124 may transmit an alert signal to the server 108 at any time the power demand by the server on the particular power supply 124 exceeds the associated threshold. However, the server 108 may not take any action regulating CPU activity and power consumption in response to receiving the alert as long the power supplies providing power to the server are both (or all) active.

3. SERVER CONTROL SYSTEM

A server control system may receive the signal indicating that a power supply has ceased providing power and the alert signal indicating that the remaining power supply (or supplies) is providing power beyond a threshold level. In response, embodiments of the server control system described below may adjust server CPU activity and, correspondingly, reduce server power consumption. The process executed by the server control system (described below) reduces CPU processing activity to a degree that is based on an extent to which the actual power supplied by the remaining power supply exceeds a power supply threshold value. In this way, the server control system preserves as much CPU processing activity as possible until the excess power supply condition is resolved (e.g., by re-engaging a redundant power source). Power demand by the server on the remaining power supply may be re-evaluated within sequential measurement intervals so that the power consumption of the server is progressively increased as permitted by the limitation power supply limitation imposed by the power supply threshold value.

The operation of a server control system as described herein is unlike the traditional execution of the prochot protocol, which dramatically reduces CPU power consumption by a fixed amount of power and a fixed duration. This dramatic reduction may be out of proportion with the severity of the problem prompting the execution of prochot. Using the techniques described below, a power consumption instruction may be written in a memory register by a server control system to reduce CPU power consumption. This power consumption level may be rewritten to the memory register for successive measurement intervals, thereby adjusting power consumption to maximize CPU performance based on power availability. In some examples, the system may engage prochot for brief periods of time determined by the power consumption instruction, to control the CPU power consumption. In other examples, another protocol may be used to control CPU power consumption.

Figure 2:
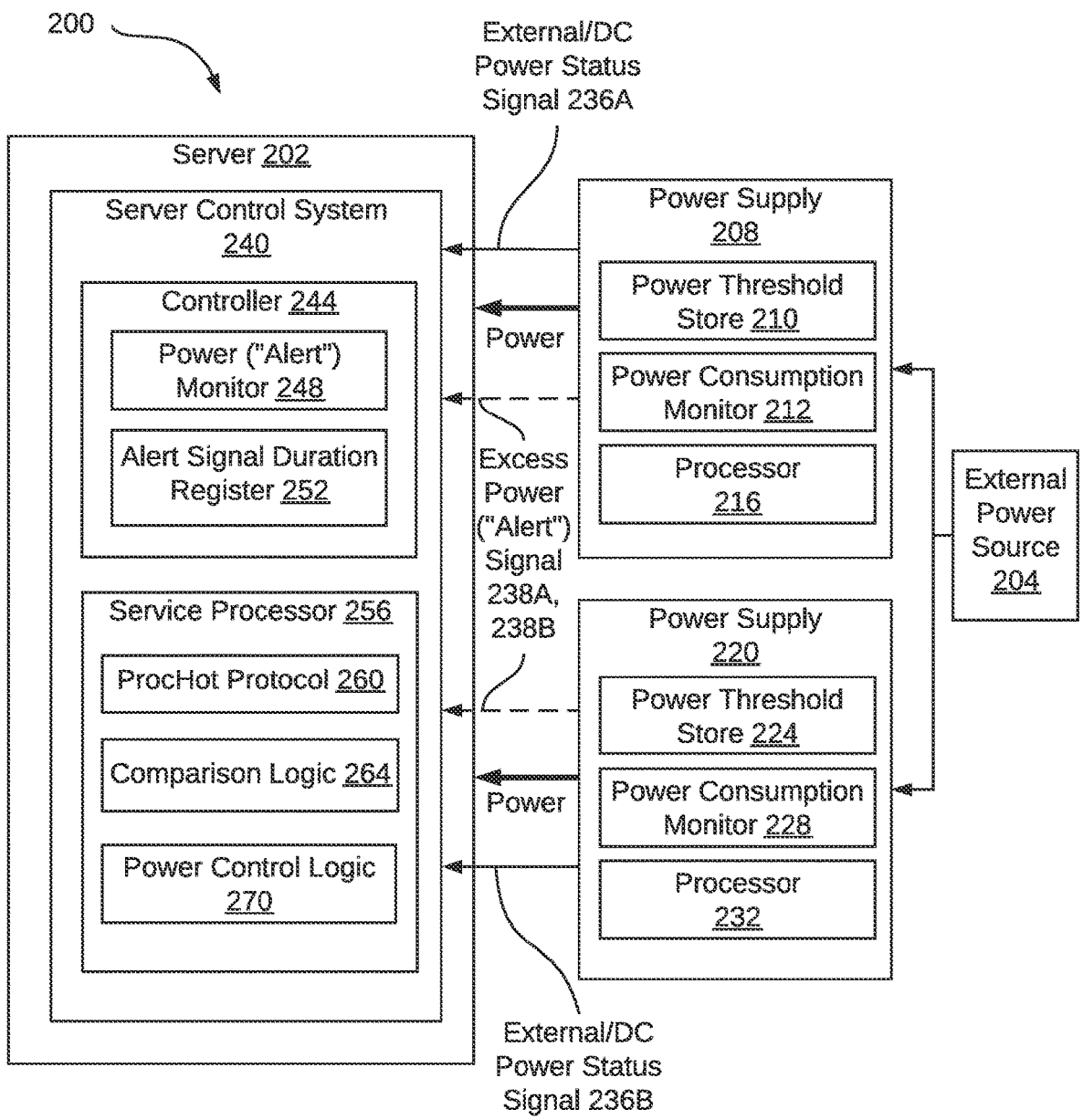
FIG. 2 schematically illustrates a server control system in communication with a set of multiple redundant power supplies in accordance with one or more embodiments.

FIG. 2 illustrates an example system 200 that includes a server 202, an external power source 204, a first power supply 208, and a second power supply 220.

The elements of the server 202 are analogous to those described above for the server 108 and are omitted in FIG. 2 for clarity.

One or more external power sources 204 supplies power to power supplies 208, 220. External power source 204 represents, collectively, various elements of a power generation and transmission grid. For example, the external power source 204 may include a power generating system, whether a point source of power (e.g., a power plant) or a local source of power in a distributed power generation system (e.g., solar panels on a computer center building roof). The external power source 204 also may include power transmission lines, transformers, sub-stations, switches, and other elements used for transmitting power from a power source to a load (in this case, the server 202). In some examples, the external power sources 204 actually include multiple independent power sources 204 that individually provide power to each of the power supplies 208, 220. In some scenarios, some combinations of the independent power sources 204 may fail so that only one of the power supplies 208, 220 is affected.

The power supply 208 includes a power threshold store 210, a power consumption monitor 212, and a processor 216. The power supply 220 includes a power threshold store 224, a power consumption monitor 228, and a processor 232. Examples of a power threshold store, a power consumption monitor, and a processor have been presented above in the context of FIG. 1C. These elements are included in FIG. 2 for completeness, and their preceding descriptions in FIG. 1C are applicable to FIG. 2.

The power supplies 208, 220 both receive power from the external power source, and transform or otherwise convert the externally supplied power to a form that may be used by the server 202. For example, the power supplies 208, 220 may alter voltage and current values (among other characteristics) of the received power to voltage and current values usable by the server for operation.

Each of the power supplies 208, 220 transmits data two signals (or a single signal with two constituent sub-signals) to the server 202, and more specifically to the server control system 240 in communication with the server 202. A first transmitted signal 236A, 236B from each of the power supplies 208, 220 indicates a status of one or both of (a) power from the external power source 204 into the power supplies 208, 220 and (b) power from a corresponding power supply 208, 220 to the server 202. A second transmitted signal 238A, 238B from each of the power supplies 208, 220 indicates whether a power supply 208, 220 is providing a level of power (e.g., as measured in Watts) to the server 202 that exceeds a power threshold value stored in the power threshold store 210. In some examples, the power supply 208, 220 determines whether or not to transmit this alert signal 238A, 238B by using the processor 216 to compare a power consumption to a threshold. Alternatively, the power supply 208, 220 may transmit the excess power signal 238A, 238B any time the power supplied by a power supply 208, 220 exceeds a threshold value 210, 224. The server control system may determine whether or not to act in response to the received alert based on a number of active power supplies.

More specifically, in the example shown in FIG. 2, the first signal from the power supply 208 to the server 202 is identified as External/DC power status signal 236A. The signal from the power supply 220 to the server 202 is identified as External/DC power status signal 236B. In this example, the External power status portion of the signals 236A, 236B indicates whether the external power source 204 is currently supplying power to the power supplies 208, 220. In the illustrated example, the DC status portion of the signals 236A, 236B indicates whether the power supplies 208, 220, respectively, are providing DC power to the server 202. The arrows 238A, 238B in FIG. 2 are dashed to indicate their optional transmission. FIG. 2 also includes arrows labeled "Power" to indicate transmission of power from the power supplies 208, 220 to the server 202 in addition to the signals 236A, 236B, 238A, 238B.

The server control system 240 of the server may monitor the signals 236A, 236B, 238A, 238B and respond according to some of the examples described below. The server control system 240 includes a controller 244 and a service processor 256.

The controller 244 of the server control system 240 further includes a power monitor 248 and an alert signal duration register 252. The service processor 256 further includes prochot protocol logic 260, comparison logic 264, and power control logic 270.

In some examples, the controller 244 and elements of the service processor 256 may be instantiated as a microprocessor chip or chipset or within a programmable circuit such as an FPGA. For example, the controller 244 and/or the service processor 256 may include a logic microprocessor, FPGA, ASIC, and/or memory elements such as DRAM, SRAM, flash memory, and the like.

More specifically, the power monitor 248 of the server control system 240 monitors the received power signals 236A, 236B, 238A, and 238B. In some examples, the power monitor 248 initiates power control management processes upon, first, detecting that one of the power supplies 208, 220 is no longer supplying power via one of the signals 236A, 236B (or a cessation of one of the signals 236A, 236B). A second step in an example process after detecting cessation of power from one of the power supplies 208, 220 is to determine whether the remaining one active power supply 208 or 220 is supplying power in excess of a power threshold, as indicated by the excess power signal or "alert" signal 238A or 238B.

In some examples, as a precursor to the second step, the power monitor 248 may rewrite a value the power threshold store 210, 224 of the remaining active one of the power supplies 208, 220 to a level associated with the alert. That is, in some cases the power threshold stores 210, 224 may both initially store a threshold power level that is used when both power supplies 208, 220 are operating. Upon determining that one of the power supplies 208, 220 has ceased providing power, the power monitor 248 may write to the power threshold store 210, 220 for the one remaining power supply 208, 220 an updated threshold value.

In other examples, the power threshold stores 210, 224 may both store a first threshold power level used when both of the power supplies 208, 220 are operating and also store a second threshold power level that is activated when one of the power supplies 208, 220 is inoperative. This second threshold power level may be less than the first power threshold level. In some examples, the second power threshold level is a value that is less than half of the first threshold power level, less than half of a maximum power rating for the power supply, and/or less than a rating for a circuit breaker in communication with the active power supply.

As described above, the alert signal may be generated by a processor within the active power supply 208, 220. The processor may compare the power supplied (e.g., in Watts) to a server, as measured by a power consumption monitor, to a power level stored in the power threshold store 210, 224. In some cases, the power level stored in the power threshold store 210 or 224 of the one remaining active power supply 208 or 220 is a lower value than a preceding value stored in the power threshold stores 210, 224 when both power supplies 208, 220 are actively providing power to the server 202.

During a situation in which provided power exceeds the threshold value, an alert signal 238A or 238B is sent (continuously or periodically) to the server control system. In some examples, the service processor 256 may respond to the alert signal 238A, 238B to prevent a catastrophic power interruption. For example, the service processor 256 may interact with other elements of the server control system 240 to prevent activation of circuit breakers associated with a power supply 208 or 220, thereby preventing a total power outage of the server 202. In some examples, prior to engaging a proportional response to the "excess power alert" from a remaining power supply 208 or 220, the server control system 240 may optionally instruct the service processor 256 to engage the prochot protocol 260 in its traditional form—for a pre-determined and fixed time period and a pre-determined, fixed level of power reduction. As described above, this traditional application of the prochot protocol 260 dramatically reduces CPU activity, thereby causing a dramatic reduction in power consumption.

In other embodiments, the server control system 240 may tailor the reduction in power consumption using a different power reduction algorithm that instructs the CPU to reduce its activity in proportion to the power delivered to the server 202. In other examples, the system may apply the prochot protocol to reduce CPU power but limit the duration of the time that prochot is engaged so that the power reduction is in proportion to the power delivered to the server 202. Regardless of the specific protocol used, this tailored approach may avoid or reduce the significant loss of CPU productivity caused by engaging the prochot protocol.

In some examples, this tailored approach is accomplished, in part, by the alert signal duration register 252. The alert signal duration register 252 includes a storage media (e.g., DRAM, flash memory, a cyclical storage memory structure) that defines and records a time period (or multiple serial time periods having a same duration) and then compares a duration of an alert signal received at the power monitor 248 to the defined period of time.

The comparison logic 264 in the service processor 256 compares the time period stored in the alert signal duration register 252 to a duration of an alert signal for a corresponding time period. The comparison logic 264 thus determines a proportion of each successive time period (also referred to as a "measurement interval") stored in the alert signal duration register 252 during which an alert signal 238A or 238B is active. The system recognizes this proportion as a proxy for a severity of the power event in which a power supply provides power over a threshold value.

The server control system 240, and specifically the power control logic 270, may determine an extent to which CPU activity is reduced based on the determined proportion of time during which an alert is active. Specifically, the power control logic 270 may transmit instructions that reduce CPU process cycles per unit time, slow CPU clock speeds/duty cycle, or otherwise reduce the power drawn by a CPU in proportion to a severity of the excess power event. In some examples, the power control logic 270 instructs the prochot protocol 260 to activate for a duration of time that is based on the determined proportion of time in the measurement interval that the alert is active. In other examples, another instruction or protocol may be used to reduce server 202 (e.g., CPU) power consumption.

In some examples, the power control logic 270 may recalculate the proportion of a measurement period during which an alert is asserted. In this way, the reduction of CPU activity is decreased (i.e., CPU activity itself is increased) as the frequency and/or duration of alert signals during a measurement period goes down. That is, the system increases CPU activity as permitted by fewer, less frequent, or shorter duration alert signals are received. In some embodiments, the system may progressively increase CPU activity (e.g., in successive measurement periods) after the initial CPU power reduction (whether by traditional application of prochot or some other means). The monitoring described above continues so that the system may respond to changes to the frequency and/or duration of alert signals during subsequent measurement periods.

As indicated above, these changes to CPU activity may be accomplished by writing corresponding values to a power consumption memory register that controls or influences CPU power consumption and/or performance. This power consumption memory register may be in the server control system 240 (e.g., in the controller 244, in the service processor 256, in the power control logic 270) or in the CPU itself.

Some embodiments may include at least two of the following advantages. First, the technique reduces CPU power consumption in proportion to the extent to which the power drawn by the server exceeds the power supply threshold value. This means that the power reduction is adjusted based on the duration of time during which the power supplied by the power supply to the server exceeds the threshold value. This may reduce or avoid the dramatic reduction in CPU speed and/or productivity that results from application of prochot.

Second, the degree to which the server exceeds the power supply threshold value is re-evaluated by the system every unit of time ("measurement interval") defined by the alert signal duration register 252. This applies a feedback mechanism by which the CPU activity level may be adjusted repeatedly (e.g., periodically for successive measurement intervals) during an excess power event. This is in contrast to a traditional application of prochot, which applies a fixed CPU activity reduction for a pre-defined and fixed period of time.

In one or more embodiments, aspects of various embodiment may be stored in a data repository. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as a server (e.g., server 202). Alternatively or additionally, a data repository may be implemented or executed on a computing system separate from the server 202. A data repository 104 may be communicatively coupled to the server 202 via a direct connection or via a network.

Information describing the systems 100, 200 and the methods 300, 400 may be implemented across any of components within the systems 100, 200.

In one or more embodiments, systems 100, 200 refer to hardware and/or software configured to perform operations described herein for the methods 300, 400.

In an embodiment, the systems 100, 200 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

4. METHODS FOR CONTROLLING SERVER POWER CONSUMPTION

FIG. 3 and FIG. 4 illustrate example operations, collectively referred to as methods 300 and method 400, respectively, for optimizing CPU performance during an event in which a subset of power supplies (e.g., one power supply) of a set of power supplies (e.g., two power supplies) ceases to provide power to a server.

The method 300 illustrated in FIG. 3 begins by a system first identifying a server and at least two power supplies connected to the server that are actively providing power to the server (operation 304). As indicated above, the techniques described herein are applicable to a set that includes any number of power supplies, a smaller subset of which may cease to provide power. The following examples are described in the context of two power supplies, one of which ceases operation, for convenience and clarity of description.

As described above, the operation 304 may be performed as described above by each of the (at least) two power supplies transmitting a signal to the server that indicates that power is actively being supplied. This signal may actually include two components. A first component of the signal indicates that a power source input is active (e.g., "External Power OK") and a second component of the signal indicates that power from the power supply itself to the server is active (e.g., "DC Power OK").

In some examples, the power signal status data may be associated with specific device identifiers. For example, the system may identify a server and its connected power supplies by corresponding identifiers present in packet metadata or identifiers transmitted in response to a specific query for the identifier. Example identifiers include IP address, media access control (MAC) identifier (ID), device serial number, or other unique device identifier.

In one example, the system may query, ping, or otherwise communicate with one or more servers and power supplies. In response to a query, the servers and power supplies may transmit replies to the query that include corresponding device identifiers and power status indicators. In other examples, the server itself may transmit queries or pings to the connected power supplies and store the identifying information associated with the power supplies. The server may then transmit a communication to the system that provides its own identifier with the identifiers of the connected power supplies.

In other examples, a facility power system network diagram may identify a server (via an identifier) and its connected power supplies. The facility power system network diagram may be stored in a storage device and accessed by the system to execute the operation 304. A status for the external and DC power supplies may be associated with the power system network diagram to provide a visual, real time display of power status across a facility.

For power situations in which both power supplies are operating, the following operations of the method 300 are not be applied. Instead, prior to detecting cessation of power transmission from one of the power supplies, the system may monitor a power consumption rate of the server and compare the server power consumption to power threshold values associated with the connected and active power supplies. Even in situations in which one of the connected and active power supplies exceeds a threshold value (e.g., a recommended power supply value), an alert may not be generated. Rather, because the other power supply remains active, no alert need be generated because increased power demands can be re-distributed between the active power supplies. In other examples, even if an alert is generated, the system need not apply the operations of the method 300 because multiple power supplies are active.

The system may then detect a cessation of power from one of the power supplies (operation 308). In some examples, the system determines that only a single power supply is actively supplying power to the server (e.g., one of two power supplies remains active). The system may detect that one of the power status signals has changed from "Ok" (indicating a transmission of power) to a status indicator associated with a cessation of power transmission. In some examples, the power status signal may simply not be detected by the system. This absence of the power status signal is associated with cessation of power transmission. This particular example may occur when a power supply itself experiences a physical failure or outage.

In other examples, the system may detect a cessation of power transmission from one of the power supplies by detecting a signal that expressly indicates "power out." In other situations, the power supply itself may experience a detectable disruption in its power provision systems but otherwise remain in operative communication with the system. The power supply may similarly retain the capability to expressly indicate the cessation of power transmission to the server.

In still other examples, the system itself may detect that a power supply is no longer transmitted power to the server. For example, a server may monitor power flow through individual ports, each of which is dedicated and assigned to a power supply. The server may monitor power flow (e.g., via a power measurement meter) or simply the presence of power (e.g., via an amp meter) through each of the individual power ports. Using these measurement techniques, the system itself may detect that one of the power supplies has ceased to provide power.

Continuing with the method 300, in response to detecting a cessation of power transmission, the system identifies a power consumption rate of the server drawn from the remaining active power source (operation 312). This measurement of power flow may, as described above, be performed by an appropriately configured power flow measurement device in communication with the remaining active power source. The power flow measurement device may be connected to the remaining active power source itself, a power transmission line from the remaining active power source, or a power port dedicated to the power transmission line from the remaining active power source.

The system compares a quantity of power flowing from the remaining active power source to a threshold power supply value associated with the remaining active power source (operation 316). As described above, this power threshold value may be stored in a memory device associated with the power supply itself. In other examples, the power threshold value may be stored in a memory device associated with the server or other convenient structure within the system. In some examples, the threshold power supply value in the operation 316 is a power supply threshold that is used when the number of active power supplies is reduced (e.g., from two active power supplies to one active power supply) and may be an alternative value to thresholds used when all power supplies associated with a server are active.

The value of the power threshold value may be selected in relationship to a maximum power rating of a power supply, circuit breaker activation values, or other similar performance criteria associated with the power supply. For example, the power threshold value may be selected to have a value lower that the maximum power rating of the power supply and/or lower than circuit breaker activation values for any circuit breakers in communication with the system. In one illustration, if a power supply is rated to supply a maximum of 800 Watts (W) of power, the power threshold value may be set to 700 W or 600 W.

In some examples, the power threshold value may be selected in relation to a number of power supplies, their rated maximum values, and the power demands of the server to which the power supplies are connected. For example, the power threshold value may correspond to a value that evenly or proportionately divides power to the server between the power supplies. In one illustration, if a server typically consumes 1000 W, and each of two power supplies is rated up to 800 W, the power threshold value may be set to 550 W to evenly spread the electrical demands between the two power supplies.

The system then compares the quantity of power consumed by the server through the remaining active power supply, as identified in the operation 312, to the power supply threshold value (operation 316). This comparison may be executed by a processor within the power supply itself, as illustrated in FIG. 1C. Alternatively, a power control system of a server may execute this comparison.

If the power consumed by the server is less than the power supply threshold value, then the system does not transmit an alert to the server (operation 320). In this example, the system may continue to monitor (continuously or periodically) the quantity of power being supplied relative to the threshold value.

If the power consumed by the server is greater than the power supply threshold value, then the system transmits an alert to the server (operation 324). This alert signal indicates that the threshold value of the power supply is exceeded. In some examples, this alert may not be transmitted when all power supplies are active. In other examples, the alert may be transmitted when all power supplies are active and a threshold is exceeded, but the system may simply not act on the alert under these circumstances.

In response to receiving the alert signal indicating that a threshold value of a power supply is exceeded, the system may reduce server power consumption (operation 328). In some examples, the system reduces server power consumption by reducing server CPU activity to a level that balances CPU productivity with the quantity of incoming power. This is contrast to a traditional application of prochot, which reduces CPU activity and power consumption by a fixed (and usually significant) amount and time duration that is not based on a severity of the power situation.

In some examples, the alert signal is received, but the receipt of the alert does not alter the quantity of power consumed by the server from the remaining active power supply (operation 328). For example, the system may not act upon determining that the power drawn from the remaining power supply in excess of the threshold is not severe enough to warrant action. As described below, the duration of time during which the power threshold is exceeded may be brief (or infrequent) and as such the system may refrain from changing server power consumption. Examples of this situation are described below.

The operation 328 may include determining a proportion of a unit of time during which the power consumption of the server (e.g., the CPU) exceeds the threshold value (operation 332). As described above, a memory structure in the system may be in communication with a clock or other measurement system that may be used as a proxy for time (e.g., a counter, a number of system clock cycles). The memory structure may collect and store an alert signal status during successive measurement intervals identify by the clock. For each subunit of time, the system determines whether an alert signal is received from the power supply.

In one illustration, a measurement interval may be one second and a measurement discrimination may be 1 millisecond interval. The system may receive an alert signal for 100 milliseconds within a particular 1 second measurement interval. In one example, the alert signal may be active for a continuous 100 millisecond during the particular 1 second measurement interval. In another example, the alert signal may be active sporadically in a plurality of alert events interspersed with non-alert periods, the former of which total 100 milliseconds within the particular 1 second measurement interval.

Regardless, the system uses these data to determine that the server power consumption exceeded the active power supply threshold during 10% of the measurement interval (or, equivalently, measured unit of time).

Based on this determined proportion of the unit of time during which the alert signal was active, the system determines a reduction in the power consumption of the server (operation 336). In some embodiments, the system may determine a reduction in the power consumption of the CPU of the server specifically.

In some examples, the system determines the reduction in power in direct proportion to the proportion of time during which the power threshold value for the remaining power supply was exceeded. Continuing with the preceding example, the system may determine that a power reduction of 10% is to be applied if the power supply threshold was exceeded for 10% of a measurement interval. In other examples, the reduction in power may be proportional to the proportion of the measurement period during which the power supply threshold was exceeded (e.g., 5%, 20%, 50%).

The system then causes a decrease in power consumption according to the determined reduction value (operation 340). In some examples, the system may slow a CPU clock or reduce a CPU duty cycle, thereby reducing CPU activity and power consumption. In other examples, the system may idle some CPUs in a multi-CPU system. In other examples, the system may idle ancillary functions of the server to reduce power. This may be accomplished in some examples by writing an instruction to a CPU register (or power control system register) that the system uses to control CPU activity.

As indicated above, the system may also be configured with a lower threshold below which the system does not reduce server power consumption. For example, a frequency of alerts received within a measurement period may be too low to warrant the system reducing server power consumption. Similarly, a duration of an alert period may be too brief (e.g., 10 milliseconds, 100 milliseconds) to warrant taking action. A magnitude of the power consumption over the threshold value (e.g., 0.5%, 1%, 2%) may be too low to warrant taking action.

As indicated by the dashed arrow from operation 340 to 332, these processes may be repeated so that the system continuously monitors power demands and adjusts a server power level accordingly. This process may cease when a full set of power supplies is reactivated. In some examples, the system may progressively increase system power consumption in successive measurement intervals (e.g., by increasing CPU clock speed or CPU duty cycle) as the duration/frequency of the alert signal is monitored.

In any of the operations within the operation 328, the system may optionally exert prochot if the system determines that a dramatic reduction in power consumption is warranted.

The method 400 illustrated in FIG. 4 presents another example set of operations for alerting a system to an "excess power" condition caused by a reduced set of power supplies actively supplying power to a server. Like the method 300, the method 400 begins by determining that a server is powered by at least two power supplies, for example a first power supply and a second power supply (operation 404). The techniques used for the operation 404 are analogous to those described in the context of operation 304.

The system then detects cessation of power transmission from one of the power supplies to the server (operation 408). This process is analogous to the process described in the operation 308 illustrated in FIG. 3.

Upon detecting that one of the power supplies is no longer actively transmitting power to the server, the system then selects a power threshold for the remaining active power threshold (operation 412). This power threshold may be a different threshold (i.e., a different value) than that used when both power supplies were actively transmitting power to the server. In some examples, the power threshold may be selected at a lower value than a circuit breaker activation value, thereby decreasing the likelihood that the circuit breaker is engaged, thereby depriving the remaining power supply of power and causing a server power outage.

In other examples, as described above, power thresholds used when multiple power supplies are active may be based on values that presume a capacity to provide more power to the server than a server would normally consume. In this way, power thresholds applied to the individual power supplies of a set of multiple active power supplies may be higher that power thresholds used when a single power supply is active.

The system may use the power threshold for multiple active power supplies to trigger an alert in some examples. For example, the alert may indicate that power drawn from the power supplies exceeds the threshold, which may indicate an increased risk of activating a circuit breaker.

In other examples, the system may be configured so that, prior to the operation 416, no alert is sent for power transmission events. As described above, some power supply systems are configured such that the available power transmission capacity in a set of power supplies is greater than the operating range of power demands by a server. This excess power transmission reduces the risks to the system of high power events, thereby reducing the need for an alert.

Continuing with the method 400, after selecting the power threshold in the operation 412, the system may either configure the remaining active power supply with a power supply threshold value (operation 416) or engage a previously selected and stored power threshold value (operation 420). More specifically, the operation 416 is associated with the operations 404-412 immediately preceding the operation 416. In this example, upon preforming the operation 412, the system then configures the remaining active power supplier so that the power supply transmits an alert when the newly selected power threshold is exceeded (operation 416). In the context of the operation 420, the system uses data from a prior iteration of the operations 404-412 that did not occur concurrent to the event leading to generation of the alert. These operations 404-412 are used to generate the threshold power value and store the threshold power value in a PSU.

In this situation, the system may use the power threshold value store in the prior event to transmit the alert (operation 420).

5. EXAMPLE EMBODIMENT

A detailed example is described below for purposes of clarity. The example is presented as a set of sequential FIGS. 5A to 5D to illustrate a progression of events. Components and/or operations described below should be understood as one specific example which may not be applicable to certain embodiments. Accordingly, components and/or operations described below should not be construed as limiting the scope of any of the claims.

Figure 5A:
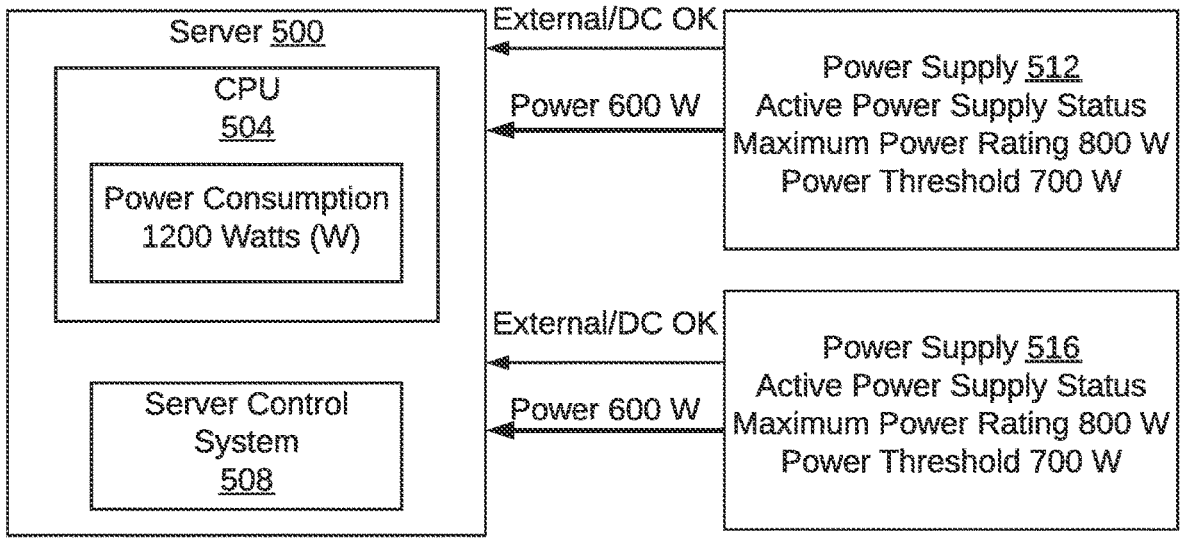
FIGS. 5A, 5B, 5C, and 5D illustrate progressive stages of an example embodiment in which the processes of FIG. 3 or FIG. 4 are applied to a server in which one of two power supplies ceases to provide power to the server in accordance with one or more embodiments.

FIG. 5A illustrates an initial scenario in which a server 500 is powered by a first power supply 512 and a second power supply 516. The server includes a CPU 504 and a server control system 508. Both the CPU 504 and the server control 508 system are analogous to the features described above. In this illustration the power consumption of the server 500 is 1200 W, although for convenience of explanation the FIGS. 5A-5D and the corresponding description describe this value as the power consumption of the CPU.

The power supply 512 and the power supply 516 are both shown as having an "active" power supply status, a maximum power rating of 800 W, and a power threshold (as stored in a memory structure of the corresponding power supply) of 700 W.

Two arrows originate from each of the power supplies 512, 516. The "External/DC OK" arrow from each of the power supplies 512, 516 indicates that the corresponding power supply is receiving external power from a power source and is transmitting DC power to the server 500. The second arrow indicates that quantity of power being provided by each of the power supplies 512, 516 to the server 500.

In the example illustrated in FIG. 5A, both the power supply 512 and the power supply 516 are providing 600 W of power to the server 500. This evenly divides the 1200 W of power consumed by the server 500 between the two power supplies 512, 516. This level of power from each power supply (600 W) is also below the maximum power rating of 800 W of each power supply 512, 516. The power threshold for the power supplies is 700 W, thereby enabling the power supplies 512, 516 to provide power that is below their maximum power rating and to respond to fluctuations in demand by the server 500. In other words, the power threshold of 700 W enables one or both the power supplies 512, 516 to respond to an increase in power demand by the server 500 without exceeding the maximum power rating of 800 W. By configuring the power supplies in this way (e.g., multiple power supplies operating well below their corresponding maximum power ratings) improves the reliability of the system by reducing a likelihood that, when both power supplies are operating, an increase in server power demands will activate circuit breakers.

Figure 5B:
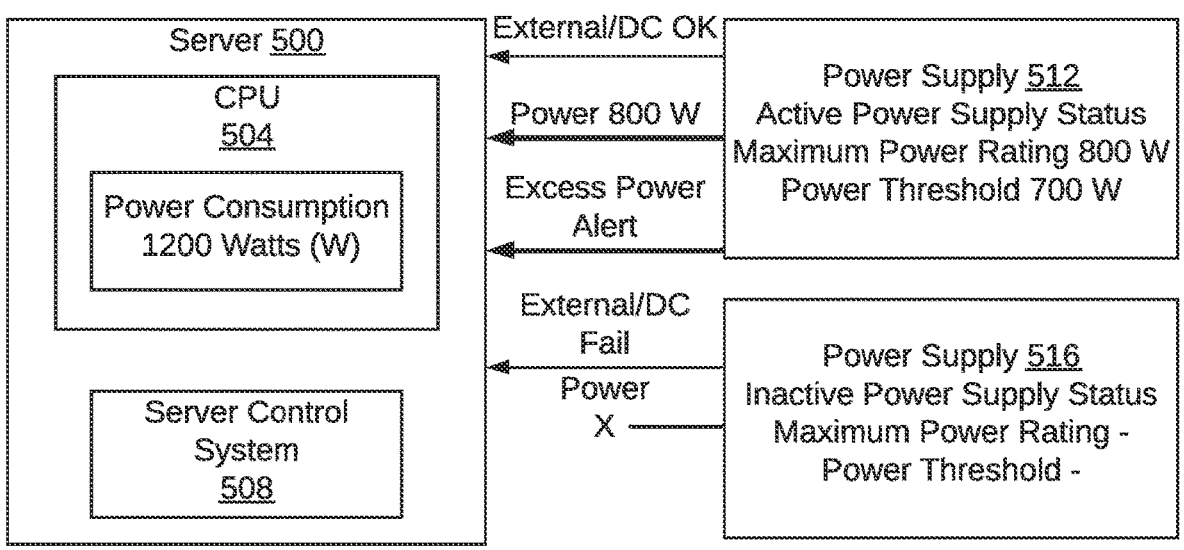
Figure 5C:
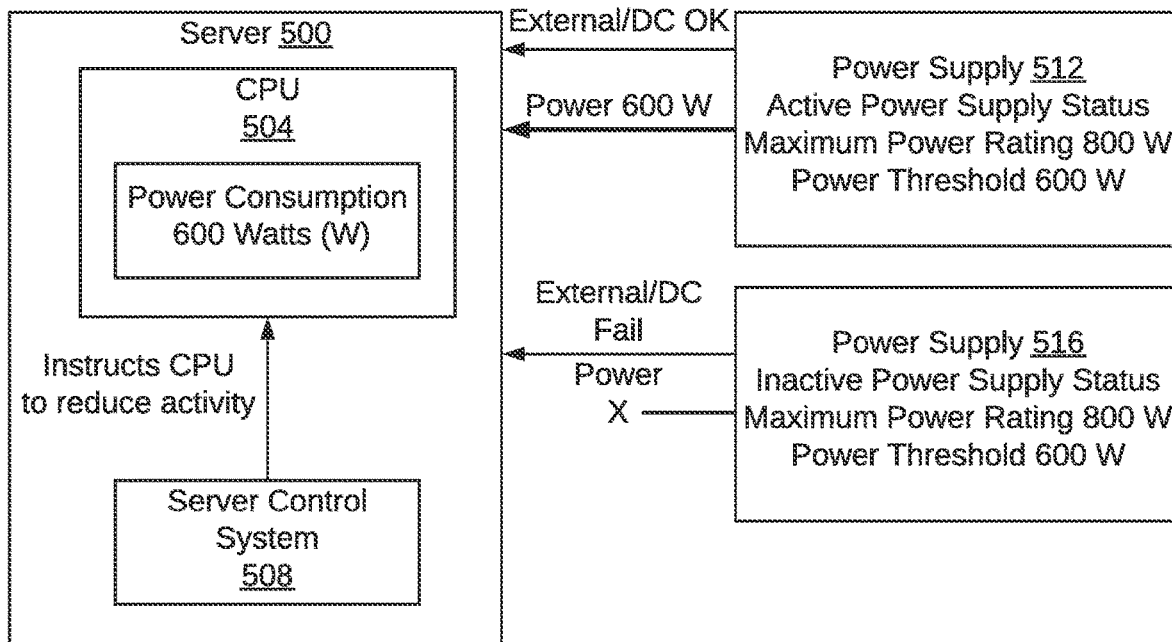

FIG. 5B illustrates a scenario in which the power supply 516 is no longer providing power, as indicated by the label "Inactive power supply status." As described above, this may be caused by a failure of the power supply 516 itself and/or a failure of a power source (not shown) to provide power to the power supply 516.

This failure of the power system is illustrated by power status signal "External/DC Fail." The former arrow indicating the transmission of power from the power supply 516 to the server is now shown as terminated by an "X," indicating that power is no longer being transmitted.

Even though the power supply 512 is still operating, its signals to the server 500, and more specifically, the server control system 508, have changed. While the server 512 is still transmitting the "External/DC OK" signal, the power transmitted as increased to 800 W. As described above, this exceeds the power threshold rating of 700 W. As a result, the power supply 512 also transmits an "excess power alert" (indicated by a new corresponding labeled arrow in FIG. 5B) to the server.

In response to receiving the "excess power alert" from the power supply 512, the server control system 508 executes one or both of the methods 300 or 400. The system reduces the power threshold of the remaining active power supply 512 to under 700 W (e.g., 600 W as shown) to further protect the system. The server 500 also reduces its CPU power consumption to under 700 W (in the illustrated example, 600 W), thereby meeting the power threshold of the power supply 512. The power supply 512 no longer transmits the "excess power alert."

Figure 5D:
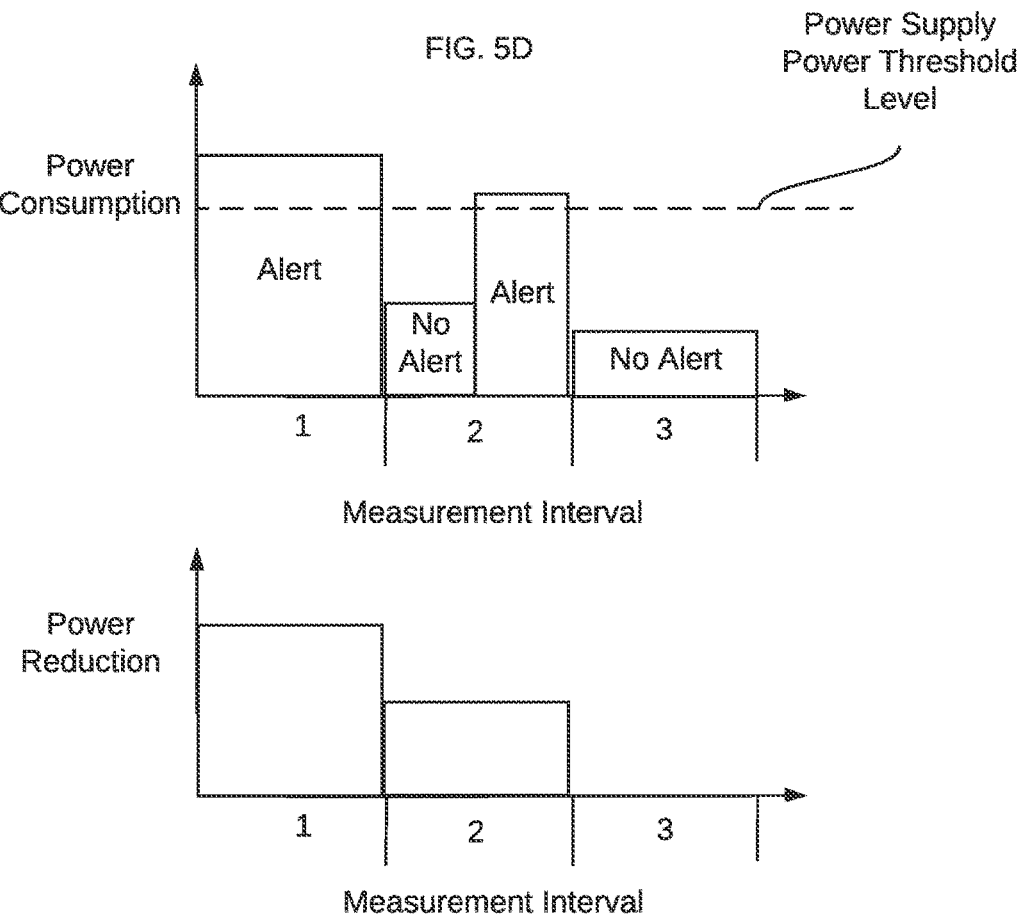

As described above, the server control system 508 may evaluate the power conditions during successive measurement intervals to determine whether to reduce server power consumption, and by how much. FIG. 5D schematically illustrates the criteria by which the server control system 508 determines how much to reduce server consumption.

FIG. 5D illustrates two graphs. A first graph ("power consumption vs. measurement interval") shows power consumption by the server for three successive measurement intervals. A power threshold level corresponding to a power supply (e.g., the power supply 512) is shown. Server power consumption may be reduced according to a proportion of a time interval during which a power supply power threshold level is exceeded, as indicated by an "alert" signal from the power supply to the server. The relative degree of power consumption reduction applied by the system is shown in the second graph ("power reduction vs. measurement interval").

Referring to the first graph, the first measurement interval (labeled "1" on the X axis) illustrates a state in which power consumption exceeds the power supply power threshold level during the entire measurement interval. This high proportion of the first measurement interval during which the system receives the alert signal produces a relatively high power reduction during the first measurement interval, as shown in the second graph.

During the second measurement interval (labeled "1" on the X axis), no alert signal is received for the first half of the second measurement interval (as indicated by the bar labeled "no alert"). An alert signal is received for the second half of the second measurement interval (as indicated by the vertical bar labeled "alert"). This generates a lower suppression of the server power consumption (approximately half of that applied during the first measurement interval).

No alert is received during the third measurement interval and correspondingly, no power reduction is applied.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
    determining a server is powered by at least a first power supply and a second power supply;
    detecting a cessation of power transmission to the server from the second power supply;
    identifying a power consumption rate of the server from the first power supply;
    determining that the power consumption rate of the server from the first power supply exceeds a threshold value; and
    responsive to detecting a concurrent occurrence of (a) the cessation of power transmission to the server via the second power supply and (b) the power consumption rate of the server from the first power supply exceeding a threshold value: transmitting an alert associated with the power consumption of the server from the first power supply.

2. The media of claim 1, further comprising:
    prior to detecting the cessation of power transmission to the server from the second power supply:
        determining that the power consumption rate of the server from the first power supply exceeds the threshold value; and
        not transmitting the alert, based on the power consumption rate, due to the second power supply continuing to supply power to the server.

3. The media of claim 1, wherein transmitting the alert associated with the power consumption of the server from the first supply is further responsive to (c) determining that the first power supply is the only power supply currently supplying power to the server.

4. The media of claim 1, wherein the alert is received without causing modification to the power consumption of the server from the first power supply.

5. The media of claim 1, further comprising:
responsive to the alert:
determining a first proportion of a first unit of time during which the power consumption rate of the server exceeds the threshold value;
determining, based on the first proportion of the first unit of time during which the power consumption rate of the server exceeds the threshold value, a reduction in a power consumption rate of at least one central processing unit of the server; and
causing a decrease in the power consumption of at least one central processing unit of the server.

6. The media of claim 5, wherein the first proportion is based on a frequency with which the alert associated with the power consumption of the server from the first power supply is received during a time period.

7. One or more non-transitory computer-readable media storing instructions, which when executed by one or more hardware processors, cause performance of operations comprising:
determining a server is powered by at least a first power supply and a second power supply;
detecting a cessation of power transmission to the server from the second power supply;
responsive to detecting the cessation of power transmission to the server from the second power supply:
selecting a first power threshold for the first power supply that was not used when the second power supply was powering the server; and
configuring the first power supply to transmit an alert when power transmitted from the first power supply exceeds the first power threshold.

8. The medium of claim 7, wherein prior to configuring the first power supply to transmit the alert when power transmitted from the first power supply exceeds the first power threshold, the first power supply was configured to transmit the alert when power transmitted from the first power supply exceeded a second power threshold, the second power threshold being higher than the first power threshold.

9. The medium of claim 7, wherein prior to configuring the first power supply to transmit the alert when power transmitted from the first power supply exceeds the first power threshold, the first power supply was not configured to transmit alerts for power consumption.

10. The medium of claim 7, wherein:
the first power supply is in communication with a first circuit breaker having a first power activation value; and
the first power threshold is less than the first circuit breaker power activation value.

11. A method comprising:
determining a server is powered by at least a first power supply and a second power supply;
detecting a cessation of power transmission to the server from the second power supply;
identifying a power consumption rate of the server from the first power supply;
determining that the power consumption rate of the server from the first power supply exceeds a threshold value; and
responsive to detecting a concurrent occurrence of (a) the cessation of power transmission to the server via the second power supply and (b) the power consumption rate of the server from the first power supply exceeding a threshold value: transmitting an alert associated with the power consumption of the server from the first power supply.

12. The method of claim 11, further comprising:
prior to detecting the cessation of power transmission to the server from the second power supply:
determining that the power consumption rate of the server from the first power supply exceeds the threshold value; and
not transmitting the alert, based on the power consumption rate, due to the second power supply continuing to supply power to the server.

13. The method of claim 11, wherein transmitting the alert associated with the power consumption of the server from the first supply is further responsive to (c) determining that the first power supply is the only power supply currently supplying power to the server.

14. The method of claim 11, wherein the alert is received without causing modification to the power consumption of the server from the first power supply.

15. The method of claim 11, further comprising:
responsive to the alert:
determining a first proportion of a first unit of time during which the power consumption rate of the server exceeds the threshold value;
determining, based on the first proportion of the first unit of time during which the power consumption rate of the server exceeds the threshold value, a reduction in a power consumption rate of at least one central processing unit of the server; and
causing a decrease in the power consumption of at least one central processing unit of the server.

16. The method of claim 15, wherein the first proportion is based on a frequency with which the alert associated with the power consumption of the server from the first power supply is received during a time period.

17. A method comprising:
determining a server is powered by at least a first power supply and a second power supply;
detecting a cessation of power transmission to the server from the second power supply;
responsive to detecting the cessation of power transmission to the server from the second power supply:
selecting a first power threshold for the first power supply that was not used when the second power supply was powering the server; and
configuring the first power supply to transmit an alert when power transmitted from the first power supply exceeds the first power threshold.

18. The method of claim 17, wherein prior to configuring the first power supply to transmit the alert when power transmitted from the first power supply exceeds the first power threshold, the first power supply was configured to transmit the alert when power transmitted from the first power supply exceeded a second power threshold, the second power threshold being higher than the first power threshold.

19. The method of claim 17, wherein prior to configuring the first power supply to transmit the alert when power transmitted from the first power supply exceeds the first power threshold, the first power supply was not configured to transmit alerts for power consumption.

20. The method of claim 17, wherein:
the first power supply is in communication with a first circuit breaker having a first power activation value; and
the first power threshold is less than the first circuit breaker power activation value.

21. A system comprising:
one or more hardware processors;
one or more non-transitory computer-readable media; and
program instructions stored on the one or more non-transitory computer-readable media, which when executed by one or more hardware processors, cause the system to:
determine a server is powered by at least a first power supply and a second power supply;
detect a cessation of power transmission to the server from the second power supply;
identify a power consumption rate of the server from the first power supply;
determine that the power consumption rate of the server from the first power supply exceeds a threshold value; and
responsive to detecting a concurrent occurrence of (a) the cessation of power transmission to the server via the second power supply and (b) the power consumption rate of the server from the first power supply exceeding a threshold value: transmit an alert associated with the power consumption of the server from the first power supply.

22. The system of claim 21, wherein the program instructions further cause the system to:
prior to detecting the cessation of power transmission to the server from the second power supply:
determine that the power consumption rate of the server from the first power supply exceeds the threshold value; and
not transmit the alert, based on the power consumption rate, due to the second power supply continuing to supply power to the server.

23. The system of claim 21, wherein transmitting the alert associated with the power consumption of the server from the first supply is further responsive to (c) determining that the first power supply is the only power supply currently supplying power to the server.

24. The system of claim 21, wherein the alert is received without causing modification to the power consumption of the server from the first power supply.

25. The system of claim 21, wherein the program instructions further cause the system to, responsive to the alert:
determine a first proportion of a first unit of time during which the power consumption rate of the server exceeds the threshold value;
determine, based on the first proportion of the first unit of time during which the power consumption rate of the server exceeds the threshold value, a reduction in a power consumption rate of at least one central processing unit of the server; and
cause a decrease in the power consumption of at least one central processing unit of the server.

26. The system of claim 25, wherein the first proportion is based on a frequency with which the alert associated with the power consumption of the server from the first power supply is received during a time period.

27. The system of claim 21, wherein the system comprises a server.

28. A system comprising:
one or more hardware processors;
one or more non-transitory computer-readable media; and
program instructions stored on the one or more non-transitory computer-readable media, which when executed by one or more hardware processors, cause the system to:
determine a server is powered by at least a first power supply and a second power supply;
detect a cessation of power transmission to the server from the second power supply;
responsive to detecting the cessation of power transmission to the server from the second power supply:
select a first power threshold for the first power supply that was not used when the second power supply was powering the server; and
configure the first power supply to transmit an alert when power transmitted from the first power supply exceeds the first power threshold.

29. The system of claim 28, wherein prior to configuring the first power supply to transmit the alert when power transmitted from the first power supply exceeds the first power threshold, the first power supply was configured to transmit the alert when power transmitted from the first power supply exceeded a second power threshold, the second power threshold being higher than the first power threshold.

30. The system of claim 28, wherein prior to configuring the first power supply to transmit the alert when power transmitted from the first power supply exceeds the first power threshold, the first power supply was not configured to transmit alerts for power consumption.

31. The system of claim 28, wherein:
the first power supply is in communication with a first circuit breaker having a first power activation value; and
the first power threshold is less than the first circuit breaker power activation value.

32. The system of claim 28, wherein the system comprises a server.

* * * * *

UNITED STATES PATENT AND TRADEMARK OFFICE
CERTIFICATE OF CORRECTION

| | |
|---|---|
| PATENT NO. | : 11,567,553 B2 |
| APPLICATION NO. | : 17/220755 |
| DATED | : January 31, 2023 |
| INVENTOR(S) | : Hartwell et al. |

It is certified that error appears in the above-identified patent and that said Letters Patent is hereby corrected as shown below:

In the Claims

In Column 27, Line 23, in Claim 7, delete "media" and insert -- medium --, therefor.

In Column 30, Line 32, in Claim 29, delete "claim 28." and insert -- claim 28, --, therefor.

Signed and Sealed this
Nineteenth Day of December, 2023

Katherine Kelly Vidal
*Director of the United States Patent and Trademark Office*